Patented Feb. 2, 1943

2,310,132

UNITED STATES PATENT OFFICE 2,310,132

MATERIAL FOR CONSTRUCTION OF ARTIFICIAL DENTURES AND PROCESS OF PRODUCING THE SAME

Leif Underdahl, Portland, Oreg.

No Drawing. Application March 14, 1939,
Serial No. 261,843

2 Claims. (Cl. 260—84)

My invention relates generally to material for construction of artificial dentures and processes of producing the same and particularly to polymerization products and processes of producing the same, suitable for use in making artificial dentures and the like.

Polymerization products for the construction of artificial dentures are obtained in accordance with the present invention by mixing together a finely divided appropriately colored mixed-polymerization product formed from an aliphatic acrylic compound free from salt groups, interpolymerized with another polymerizable monovinyl compound intimately admixed with from 22% to 37½% by weight thereof of a monomeric methyl acrylate or methyl methacrylate or homologue compounds, and a catalyst such as benzoyl peroxide.

An important object of the invention is to provide thermoplastic resinous denture materials of sufficient plastic consistency at temperatures below the boiling point of water to enable molding into the usual dental plaster of Paris denture forming mold at pressures below the compressive resistance of said dental plaster of Paris mold.

Another object of the invention is to provide thermoplastic resinous denture materials of sufficient plastic consistency at temperatures below the boiling point of water and at pressures below 500 pounds per square inch, to flow completely into all crevices of metallic and other inserts in a partial or full denture without displacement of such inserts or their retentions.

A further object of the invention is to provide thermoplastic resinous denture materials that may be polymerized into a hard, tough, solid composition at a temperature below that at which steam forms as the free and combined water of crystallization may cause objectionable blanching of the polymerization products. When plaster of Paris, the hemi-hydrate of calcium sulphate, $(CaSO_4)2H_2O$, is mixed with water it forms a plastic mass that becomes solid within one hour. The reaction between the water and the plaster of Paris occurs in two ways. Some of the water combines into a colloidal gel to form a matrix for the crystalline solids that are formed by part of the water with the plaster of Paris. That part of the water that combines to form the crystalline solids is generally referred to as the water of crystallization. The water of crystallization becomes released from the plaster mold at a temperature of 101° C. at normal atmospheric pressure, and this is the same temperature at which steam is formed.

A further object of the invention is to provide resinous denture materials that do not require coating of the plaster of Paris molds with tinfoil or other metallic coatings to prevent the denture materials from coming into contact with the blanching steam when the denture forming molds are heated above 100° C.

A further object of the invention is to provide thermoplastic resinous denture materials that do not require the usual 1½ to 10 hour dehydration of the denture forming plaster of Paris molds for the purpose of elimination of free water and water of crystallization therefrom.

A further object of the invention is to provide denture materials that do not require any elaborate and expensive equipment such as a dental vulcanizer, autoclaves, electric dry heat press or oil immersion press and associated thermometers, thermostats, and pressure regulators.

A further object of the invention is to provide time saving denture materials that may be molded in from 2 to 5 minutes at a pressure below 500 pounds per square inch, and which polymerize in boiling in water in an open kettle in from 10 to 30 minutes.

A further object of the invention is to provide denture materials that may be polymerized at the boiling temperature of water which is below the bubble forming temperature of the polymerization reaction, and be of bubble-free, uniform and homogeneous composition.

A further object of the invention is to provide denture materials that retain to a large degree the mechanical and physical properties characteristic of the mixed-polymerization products, having higher flexural fatigue resistance, greater impact strength, and lower dimensional changes than simple polymerization products made from methacrylate monomers mixed with methacrylate polymers, or straight methacrylate polymers.

A further object of the invention is to provide resinous thermoplastic denture materials characterized by sufficiently free flow at relatively low temperatures so that the necessity for construction of overflow and waste channels and gates is eliminated, thereby providing an economic advantage by reducing the amount of excess material as much as 50% from the usual thermoplastic denture blanks.

An advantage of the invention is the reduction of the heating and cooling time of the denture mold as the temperature has only to be raised to 100° C. and the heat distortion temperature is between 75° C. and 80° C. Whereas in the molding of polymerized compounds molding temperature of 140° C. to 160° C. must be employed and the heat distortion temperature is between 65° C. and 80° C.

The softening temperatures given are the temperatures at which a molded test strip 2.5 mm. x 10 mm. x 60 mm. will bend when a 50 gram weight is hung in the center of the strip which is supported at both ends at a distance of 40 mm. apart, with the temperature increasing at a rate of 1½ degrees C. per minute.

The materials of my invention each comprise, in general a mixture comprising the following ingredients in certain approximate proportions as hereinafter described, but it will be understood that the invention in its broader aspect is not restricted to these specific ingredients and proportions.

*Example 1*

15 grams of polymerized colored mixed-polymerization product derived from a preponderating quantity of powdered vinyl chloride and acrylic acid is placed in a porcelain mortar. To this is added 3.3 grams of monomeric methyl methacrylate in which 0.01 part of benzoyl peroxide has been dissolved. The resultant mixture is stirred with a porcelain pestle for 3 minutes so that a free-flowing granular, soft, rubber-like product is obtained. This may be packed immediately into the proposed plaster of Paris mold, heated to a temperature ranging between 50°–70° C. and then molded at a pressure of less than 500 pounds per square inch. The compressed hot mold is placed in boiling water for 30 minutes after which the mold is cooled to a temperature below 40° C. A bubble-free product is obtained that is substantially more flexible than the polymerization products of the respective ingredients molded under similar conditions.

*Example 2*

15 grams of polymerized colored mixed-polymerization product derived from an aliphatic acrylic compound, free from salt groups, with a preponderating quantity of another polymerizable mono-vinyl compound is placed in a porcelain mortar. To this is added 6 grams of monomeric methyl methacrylate in which 0.01 part of benzoyl peroxide has been dissolved. The resultant is stirred and kneaded with a porcelain pestle for 3 minutes so as to obtain a rubber-like elastic mass. This may be immediately packed into the plaster mold previously heated to a temperature ranging between 50° C. and 70° C. and then molded at a pressure of less than 500 pounds per square inch. The plaster mold is placed in boiling water for 10 minutes. The denture mold is cooled to room temperature.

The dentures thus obtained are hard, tough, translucent and free from bubbles and substantially more flexible and with less mold shrinkage than pure polymerized methyl methacrylate, or a polymer-monomer mixture of methyl methacrylate molded under similar conditions. The dentures do not soften at temperatures below 60°–70° C., and show high fatigue resistance and high impact strength. The dentures are exact reproductions of the plaster of Paris denture forming mold.

*Example 3*

Fifteen (15) grams of polymerized, appropriately colored, mixed-polymerization product, in finely divided form, derived from 50% aliphatic acrylic compound free from salt groups, interpolymerized with 50% of another polymerizable mono-vinyl compound is placed in a porcelain mortar. To this is added substantially six (6) grams of monomeric methyl acrylate in which 0.01 part of benzoyl peroxide has been dissolved. The resultant is kneaded with a porcelain pestle for about 3 minutes so as to obtain a rubber-like elastic mass.

This elastic mass may be molded at a pressure of less than 500 pounds per square inch when placed in a plaster mold previously heated to a temperature ranging between 40° C. and 70° C. The plaster mold is held in boiling water for about 55 minutes and thereafter allowed to cool to room temperature. The dentures obtained in this manner are exceptionally tough, translucent, free from bubbles, and are more flexible and exhibit less mold shrinkage, and absorb less water than dentures made of pure polymerized methyl acrylate or a monomer-polymer mixture of methyl acrylate and molded under similar conditions.

As an alternative procedure, for the purpose of storage, convenience in shipping, and to facilitate the packing into the denture mold, the rubber-like mass produced by the mixing and kneading may be rolled into sheets or cake form on cold rolls, wrapped in tinfoil or other opaque non-adhesive sheeting and placed in air-tight containers.

When kept cool such sheets will remain soft and retain the working properties over a period of time sufficient for distribution.

Although I have shown and described herein the preferred embodiment of the present invention, it is to be definitely understood that I do not desire to limit the application of my invention thereto, but any change or changes may be made in the materials employed and steps of operation, within the spirit of the invention and the scope of the subjoined claims.

Having described the invention, what is claimed as new is:

1. A material suitable for making dentures, said material being capable of progressive polymerization at a temperature not exceeding 100° C. in from 10 to 30 minutes, said material consisting of a soft, rubber-like, non-sticky complex plastic composition capable of being formed by mixing in an open container in about 3 minutes time, said composition being capable of being molded in a plaster mold at a temperature between 50° and 70° centigrade with a pressure of less than 500 pounds per square inch and hardening in boiling water in about 30 minutes time to produce a bubble-free product characterized by high fatigue resistance, high impact strength and extremely low mold changes, comprising a mixed-polymerization product formed from a preponderating quantity of vinyl chloride and acrylic acid as an entity, together with 22 to 37.5 percent of the total compound of monomeric methyl methacrylate.

2. A process of making a denture forming plastic material, said material consisting of a soft, rubber-like, non-sticky complex plastic composition capable of being formed by mixing in an open container in about 3 minutes time, said composition being capable of being molded in a plaster mold at a temperature between 50° and 70° centigrade with a pressure of less than 500 pounds per square inch and hardening in boiling water in about 30 minutes time to produce a bubble-free product characterized by high fatigue resistance, high impact strength and extremely low mold changes, said process comprising forming a mixed-polymerization product containing a preponderant quantity of vinyl chloride and acrylic acid as an entity and therewith mixing 22 to 37.5 percent of the total compound of a monomeric methyl methacrylate as a double functioning modifier, acting as a softener prior to molding and final progressed polymerization and as a hardener after the molding and final progressive polymerization.

LEIF UNDERDAHL.